(12) United States Patent
Tsuda et al.

(10) Patent No.: US 6,542,666 B2
(45) Date of Patent: Apr. 1, 2003

(54) OPTICAL COMPONENT

(75) Inventors: Toshiaki Tsuda, Tokyo (JP); Shigehito Yodo, Tokyo (JP); Kazuyo Mizuno, Tokyo (JP); Yu Mimura, Tokyo (JP); Toshihiko Ohta, Tokyo (JP); Yoshihiro Emori, Tokyo (JP); Shu Namiki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/804,577

(22) Filed: Mar. 12, 2001

(65) Prior Publication Data

US 2002/0025115 A1 Feb. 28, 2002

(30) Foreign Application Priority Data

Mar. 13, 2000 (JP) ........................................ 2000-068293

(51) Int. Cl.$^7$ ................................................. G02B 6/34
(52) U.S. Cl. ...................................................... 385/37
(58) Field of Search ....................... 385/37, 28; 359/161

(56) References Cited

U.S. PATENT DOCUMENTS 5,838,487 A * 11/1998 Nilsson et al. ............... 359/133
6,034,812 A * 3/2000 Naito ........................... 359/124
6,144,474 A * 11/2000 Nitta et al. ................... 359/161
6,337,937 B1 * 1/2002 Takushima et al. ........... 385/28

FOREIGN PATENT DOCUMENTS

| JP | 07-015074 | 1/1995 |
| JP | 09-244079 | 9/1997 |
| JP | 11-119030 | 4/1999 |

* cited by examiner

Primary Examiner—Lynn Field
Assistant Examiner—Brian S. Webb
(74) Attorney, Agent, or Firm—Knobbe, Martens, Olson & Bear LLP

(57) ABSTRACT

Wavelength multiplex transmission is realized in which the temperature dependency of an EDFA is compensated for in relation to the wavelengths which are used. A first and a second long-period grating which have different periods from each other are formed in an optical fiber, ensuring that the peak wavelength of a waveform representing an optical transmission loss characteristic of the first long-period grating side is located on the shorter wavelength side than a transmission band and a peak wavelength of a waveform representing an optical transmission loss characteristic of the second long-period grating side is located on the longer wavelength side within the transmission band.

18 Claims, 8 Drawing Sheets

OPTICAL COMPONENT

FIELD OF THE INVENTION

The present invention relates to an optical component which is used for compensating the temperature dependent gain characteristic (a temperature dependency of gain) of an optical amplifier such as an EDFA (optical amplifier of the erbium-doped optical fiber type).

BACKGROUND OF THE INVENTION

The evolution of the information-oriented society has set a tendency for the volume of telecommunications information to dramatically increase, therefore, progress toward a larger capacity and a faster speed in telecommunications using optical fibers is necessary and critical. An advantageous approach for a faster speed and a larger capacity is to use optical fibers doped with rare earths, such as erbium-doped optical fibers. Use of an erbium-doped optical fiber has led to development of an optical amplifier of the optical fiber amplifier type which can amplify a light signal as which remains as light, and the development of an optical amplifier of the optical fiber amplifier type has led to increasingly rapid ongoing development of large-capacity communications and long distance transmissions.

Another ongoing development, in the meantime, is development of telecommunications by the wavelength multiplex transmission method for transmitting optical signals having different wavelengths from each other on one optical fiber. Use of an optical amplifier of the optical fiber amplifier type described above in an optical communication system of the wavelength multiplex transmission method (wavelength multiplex transmission system) is expected to further expand the channel capacity and realize long distance transmission.

A typical example of an optical amplifier of the optical fiber amplifier type described above is an EDFA (erbium-doped optical fiber amplifier). There are continuing endeavors to achieve wavelength multiplex transmission as above in which an EDFA is used and a transmission band is set in a wavelength range from 1525 nm to 1565 nm, for example, which is a gain band of an EDFA.

In order to use an EDFA for wavelength multiplex transmission, it is necessary that the dependency of the gain on the wavelength is small in a transmission band, i.e., a gain is uniform in the transmission band. However, as denoted at the characteristic curves a through c in FIG. 9, the gain of an EDFA is dependent on the wavelength in the transmission band. In FIG. 9, the characteristic curve a represents the dependency of the gain in an EDFA on the wavelength at 65° C., the characteristic curve b represents the dependency of the gain in an EDFA on the wavelength at 0° C., and the characteristic curve c represents the dependency of the gain in an EDFA on the wavelength at 25° C., each in a wavelength range from 1530 nm to 1560 nm.

As described above, since an EDFA has a relatively large dependency of the gain on the wavelength, a sufficiently satisfactory result has not been obtained for high-quality wavelength multiplex transmission.

SUMMARY OF THE INVENTION

The present invention aims at providing an optical component which levels out the dependency of the gain on the wavelength of an EDFA in the wavelength range to be used. To this end, an optical component according to one aspect of the present invention has a structure as described below. That is, the optical component comprises:

a first long-period grating which is formed in an optical waveguide; and a second long-period grating which is formed in said optical waveguide, wherein said first and said second long-period gratings have different periods from each other, said first long-period grating has a peak wavelength whose amplitude waveform of optical transmission losses with respect to a wavelength is located on the shorter wavelength side than a transmission band, said amplitude waveform including said peak wavelength shifts depending on a temperature, said second long-period grating has a peak wavelength whose amplitude waveform of optical transmission losses with respect to a wavelength is located within said transmission band, said amplitude waveform including said peak wavelength shifts depending on the temperature, and due to temperature dependent shifts of said amplitude waveforms in said first and said second long-period gratings, a optical transmission loss value increases or decreases depending on the temperature, whereby the temperature dependent gain characteristic of an optical amplifier is compensated for in said transmission band.

Further, another aspect of the present invention aims at providing an optical component of a structure described below. That is, the optical component comprises first and second long-period gratings which are formed in an optical waveguide, wherein said first and said second long-period gratings respectively have unique optical transmission loss characteristics such that there are a plurality of optical transmission loss peak wavelengths of a first-order mode to an Nth-order mode which are apart from each other in terms of wavelength (where N is an integer equal to or larger than 2), the period of said first long-period grating is determined such that of the unique optical transmission loss peak wavelengths, a optical transmission loss peak wavelength of a preset-order mode is on the shorter wavelength side than a transmission band and that a optical transmission loss peak wavelength of a mode next to said preset-order mode is on the longer wavelength side than said transmission band, the period of said second long-period grating is determined such that of the unique optical transmission loss peak wavelengths, a optical transmission loss peak wavelength of a preset-order mode is on the longer wavelength side within said transmission band and that a optical transmission loss peak wavelength of a mode immediately precedent to said preset-order mode is on the shorter wavelength side than said transmission band, and amplitude waveforms, together with optical transmission loss peak wavelengths of said preset-order modes of said first and said second long-period gratings, shift toward the longer wavelength side or the shorter wavelength side depending on the temperature, and a optical transmission loss value increases or decreases depending on the temperature, whereby the temperature dependent gain characteristic of an optical amplifier is compensated for in said transmission band.

DESCRIPTION OF THE DRAWINGS

Exemplary embodiments of the invention will now be described in conjunction with the drawings in which.

DETAILED DESCRIPTION

Figure 9:
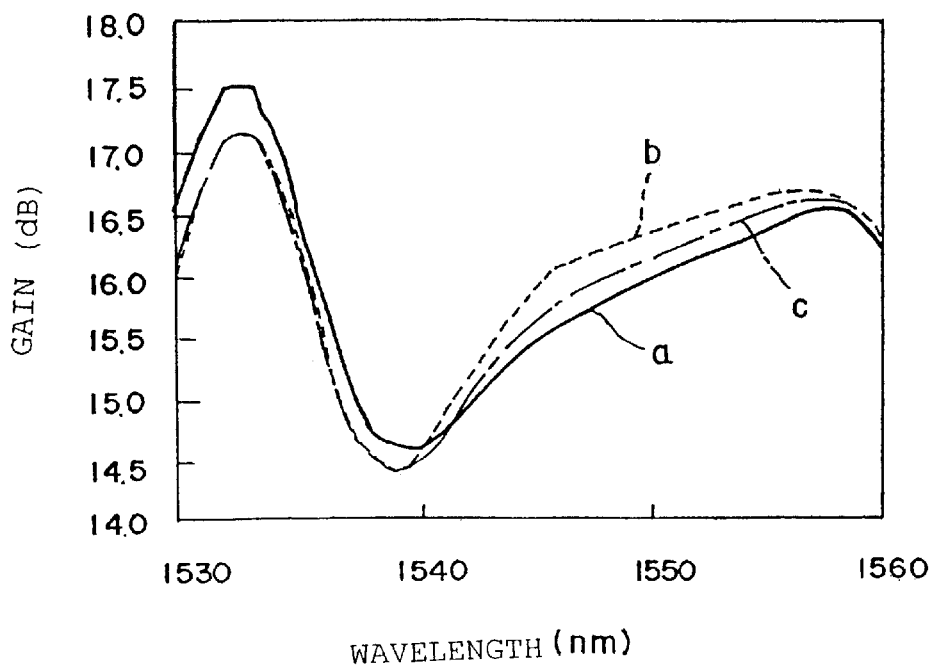
FIG. 9 is a graph of the dependency of the gain on the wavelength of an EDFA.

For compensation of the dependency of the gain on the wavelength of an EDFA such as that shown in FIG. 9, an EDFA device combining an etalon filter, for gain equalization, with an EDFA is used, for instance.

Figure 10:
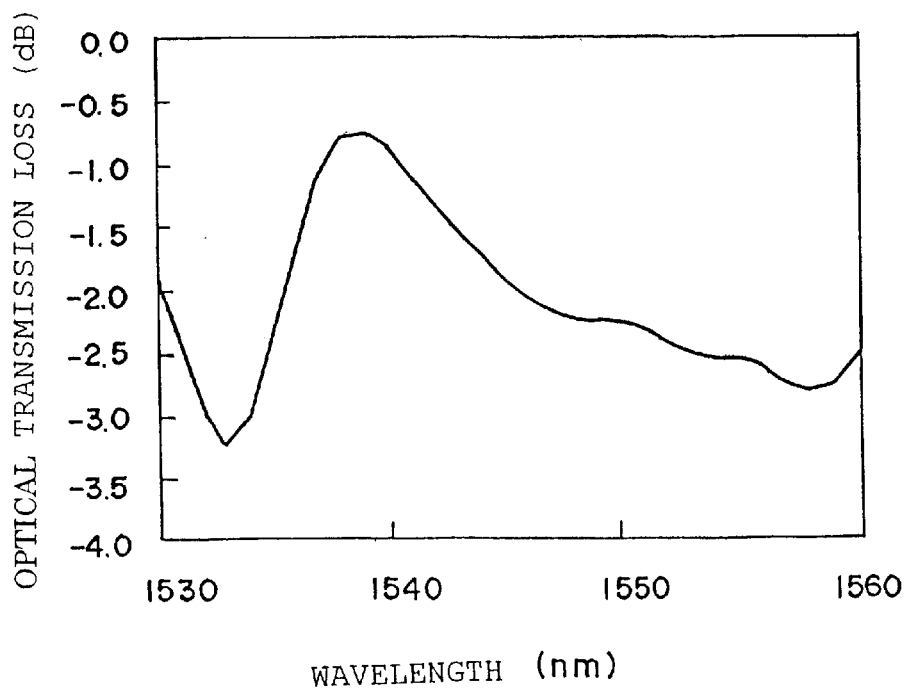
FIG. 10 is a graph of a optical transmission characteristic at 25° C. of an etalon filter which is used in combination with an EDFA.

An etalon filter used for the EDFA device as described above is formed such that the optical transmission loss characteristic at a wavelength in the vicinity of 1530 nm to 1540 nm at 25° C., for example, is opposite to the dependency of the gain on the wavelength of an EDFA. More precisely, as shown in FIG. 10, the optical transmission loss characteristic of the etalon filter which is used in the EDFA device above is that the optical transmission loss is minimum at a wavelength in the vicinity of 1533 nm but increases toward approximately 1530 nm from approximately 1533 nm and toward approximately 1540 nm from approximately 1533 nm Where an etalon filter having such a optical transmission loss characteristic is combined with an EDFA, it is possible to compensate the large dependency of the gain on the wavelength of the EDFA at a wavelength in the vicinity of 1530 nm to 1540 nm at 25° C., for example. This in turn makes it possible to realize wavelength multiplex transmission at 25° C., using a wide transmission band from 1533 nm to 1610 nm.

Figure 7:
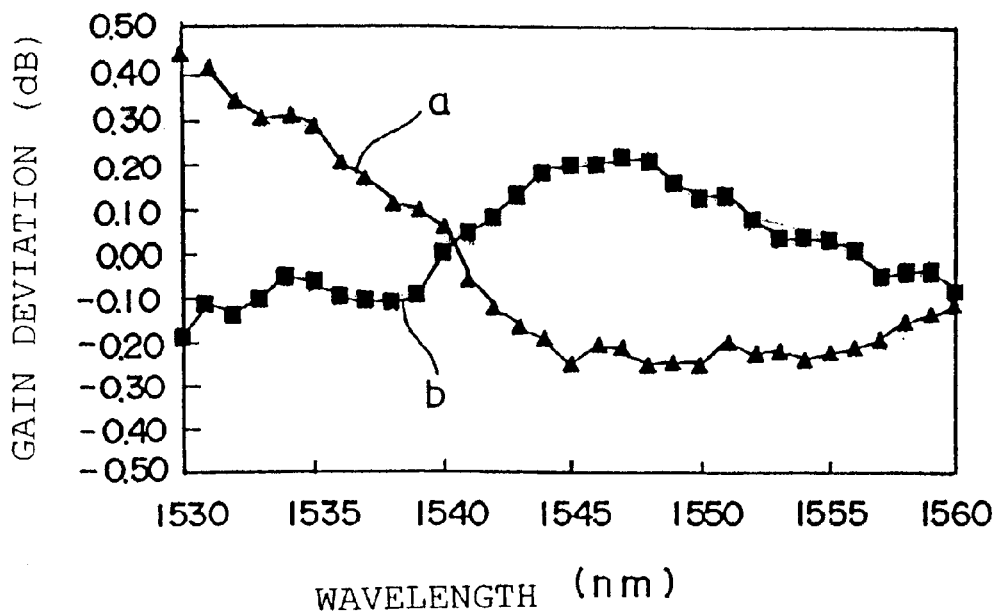
FIG. 7 is a graph of gain deviations of an EDFA at 0° C. and 65° C. relative to 25° C. which is used as a reference.

However, since the gain of the EDFA above is dependent on a temperature, the gain characteristics differ depending on the temperature as denoted at the characteristic curves a through c in FIG. 9. Identifying the gain characteristic of the EDFA at 65° C. against a reference gain characteristic of the EDFA at 25° C. and setting the resultant value as a gain deviation from 25° C. to 65° C., the characteristic curve a in FIG. 7 is obtained. The temperature of 65° C. is said to be the upper limit temperature for an environment in which a wavelength multiplex transmission system is used.

Further, by referencing the gain characteristic of the EDFA at 0° C. against the reference gain characteristic of the EDFA at 25° C. and setting a resultant value as the gain deviation from 25° C. to 0° C., the characteristic curve b in FIG. 7 is obtained. The temperature of 0° C. is said to be the lower limit temperature of an environment in which a wavelength multiplex a transmission system is used.

As the characteristic curves a and b clearly show, to the wavelength of 1530 nm, the EDFA exhibits the temperature dependent gain characteristic that a gain deviation from 25° C. to 65° C. is approximately 0.45 dB and a gain deviation from 25° C. to 0° C. is approximately −0.2 dB. In addition, the EDFA exhibits the temperature dependent gain characteristic that a gain deviation from 25° C. to 65° C. is 0.2 dB or larger and a gain deviation from 25° C. to 0° C. is approximately −0.2 dB in a wavelength range from 1545 nm to 1555 nm.

On the other hand, the etalon filter described above has a optical transmission loss characteristic such that the temperature dependency shift characteristic is approximately 0.006 nm/° C. Thus, the optical transmission loss characteristic shifts toward the longer wavelength side as a temperature of the environment of use increases, and the optical transmission loss characteristic shifts toward the shorter wavelength side as the temperature of the environment becomes lower.

Figure 8:
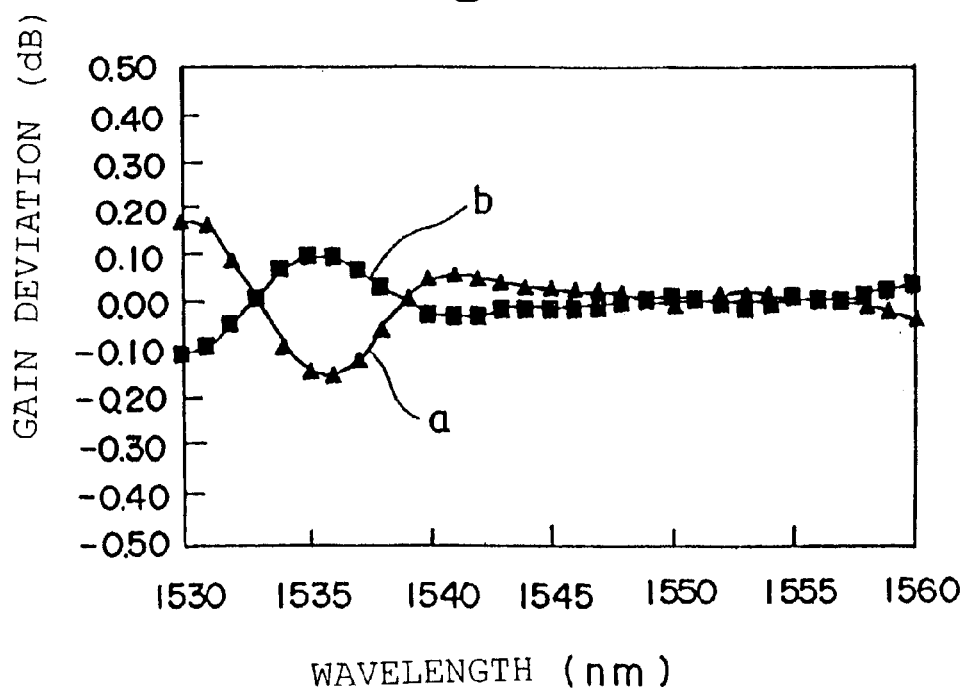
FIG. 8 is a graph of loss deviations of an etalon filter which is used as the gain equalizer of an EDFA, at 0° C. and 65° C. relative to 25° C. which is used as a reference.

Hence, by referencing the optical transmission loss characteristic of the etalon filter having such a characteristic as that shown in FIG. 10 at 65° C. against a reference optical transmission loss characteristic of the etalon filter at 25° C. and setting a resultant value as the loss deviation from 25° C. to 65° C., the characteristic curve a in FIG. 8 is obtained. By referencing the optical transmission loss characteristic of the etalon filter at 0° C. against the reference optical transmission loss characteristic of the etalon filter at 25° C. and setting a resultant value as the loss deviation from 25° C. to 0° C., the characteristic curve b in FIG. 8 is obtained.

As the characteristic curve a in FIG. 8 clearly shows, the etalon filter described above has a gain deviation of approximately 0.2 dB from 25° C. to 65° C. at the wavelength of 1530 nm. Between 25° C. and 65° C., both the loss deviation of the etalon filter and the gain deviation of the EDFA above (0.45 dB as shown in FIG. 7) have positive values. Hence, in the case of an EDFA device combining the etalon filter above, as a gain equalizer, with the EDFA above, the gain deviation increases from 25° C. to 65° C. toward the positive side in the vicinity of 1530 nm.

Further, as the characteristic curve b in FIG. 8 clearly shows, the etalon filter described above has a loss deviation from 25° C. to 0° C. of approximately −0.1 dB at the wavelength of 1530 nm. From 25° C. and 0° C., both the loss deviation of the etalon filter and the gain deviation of the EDFA above (−0.2 dB as shown in FIG. 7) have negative values. In the case of an EDFA device combining the etalon filter above as a gain equalizer with the EDFA above, therefore, the gain deviation increases from 25° C. to 0° C. toward the negative side in the vicinity of 1530 nm.

Hence, the gain deviation of the EDFA device combining the EDFA above with the etalon filter above gradually increases from 25° C. to 65° C. at a wavelength of 1535 nm or shorter, for instance, reaching as large as 0.65 dB at 1530 nm. Conversely, the gain deviation of the EDFA device gradually decreases from 25° C. to 0° C. at a wavelength of 1535 nm or shorter, dropping even to −0.3 dB at 1530 nm.

Thus, although applying an EDFA device to a wavelength multiplex transmission system demands that the gain deviation from 25° C. to 65° C. and the gain deviation from 25° C. to 0° C. are both approximately ±0.2 dB or smaller, the above EDFA device fails to meet this demand.

An optical component according to the present invention solves the above problems. In a transmission band from 1525 nm to 1565 nm, for example, the optical component can compensate for the temperature depend gain characteristic of an optical amplifier within an operating temperature range.

In an optical component according to a preferred embodiment of the present invention, a first and a second long-period gratings, having different periods formed on an optical waveguide, shift the amplitude waveforms of optical transmission losses in relation to the wavelength of the first and a second long-period gratings, depending on the temperature. Further, in a structure in which a preset-order modes for the first and the second long-period gratings are determined, optical transmission loss peak wavelengths of these preset-order modes, together with amplitude waveforms (which are amplitude waveforms including the peak wavelengths) shift toward the longer wavelength side or the shorter wavelength side depending on the temperature.

Since this is a structure in which the shift allows a optical transmission loss value to increase or decrease depending on the temperature to thereby realize compensation of the temperature dependent gain characteristic of an optical amplifier within over across a transmission band, when the optical component according to the present invention is used, it is possible to compensate the temperature dependent gain characteristic of an optical amplifier within over across a transmission band.

Hence, if the optical component according to the present invention is combined with a device which combines an optical amplifier such as an EDFA with an etalon filter (EDFA device), for example, it is possible to compensate for the temperature dependent gain characteristic of the optical amplifier in a transmission band, and hence, realize high-quality wavelength multiplex transmission over the entire operating temperature range.

In the following, preferred embodiments of the present invention will be described with reference to the associated drawings. An optical component according to a preferred embodiment of the present invention is for compensating the temperature dependent gain characteristic of an EDFA which serves as an optical amplifier in a transmission band from 1525 nm to 1565 nm, and for consequently realizing high-quality wavelength multiplex transmission in the transmission band within the operating temperature range.

This embodiment uses an optical fiber whose core is covered with a clad and which therefore serves as an optical waveguide. One example of such an optical fiber is a single-mode optical fiber which is generally used for optical communications. A refractive index profile of the optical fiber is the well-known step index type. For example, a relative refractive index difference Δ of the core relative to pure silica is 0.35% and the diameter of the core is approximately 10 μm. The core is made of silica which is doped with germanium and the clad is made of pure silica, although this is not limiting.

As herein described, the relative refractive index difference Δ (Δc) of the core relative to pure silica is defined by the following formula (1) wherein the refractive index of the core is $n_{c0}$ and the refractive index of pure silica is $n_0$:

$$\Delta c = \{(n_{co}^2 - n_o^2)/2n_{co}^2\} \times 100 \qquad (1)$$

Where the clad is not made of pure silica, the relative refractive index difference Δ (Δc) of the core relative to the clad is obtained by substituting $n_0$ with the refractive index of the clad in the formula (1) above.

In the preferred embodiment, a first long-period grating which periodically changes at approximately 375 μm and a second long-period grating which periodically changes at approximately 445 μm are formed in the optical fiber described above. Thus, the first and the second long-period gratings have different grating periods from each other. Further, in the preferred embodiment, the first and the second long-period gratings both have a length of 22 mm in the longitudinal direction.

As is well known, when ultraviolet light whose wavelength is close to 240 nm is irradiated upon silica glass doped with germanium, a defect is created in the grating of the glass, so that the glass has a property called a photogractive effect by which the refractive index increases. Utilizing this property, ultraviolet light is irradiated periodically along the longitudinal direction of the germanium-doped core and the refractive index of a core portion, for instance, is increased periodically, whereby the gratings described above are obtained. Further, such a grating whose grating period (periodical change) is approximately from 100 μm to a few hundred μm is called a long-period grating.

In order to create the first and the second long-period ratings above, in the preferred embodiment, after high-pressure hydrogenation at 15 MPa for three weeks, an argon laser which emits a second harmonic wave is irradiated upon single-mode optical fibers having such a structure as described above so that the first and the second long-period gratings are each obtained. The irradiation time for irradiating ultraviolet light upon the optical fibers to create the first long-period grating is different from the irradiation time to create the second long-period grating. Therefore, the first and the second long-period gratings have greatly different sizes of amplitude waveforms of optical transmission loss characteristics in relation to wavelengths.

Figure 11:
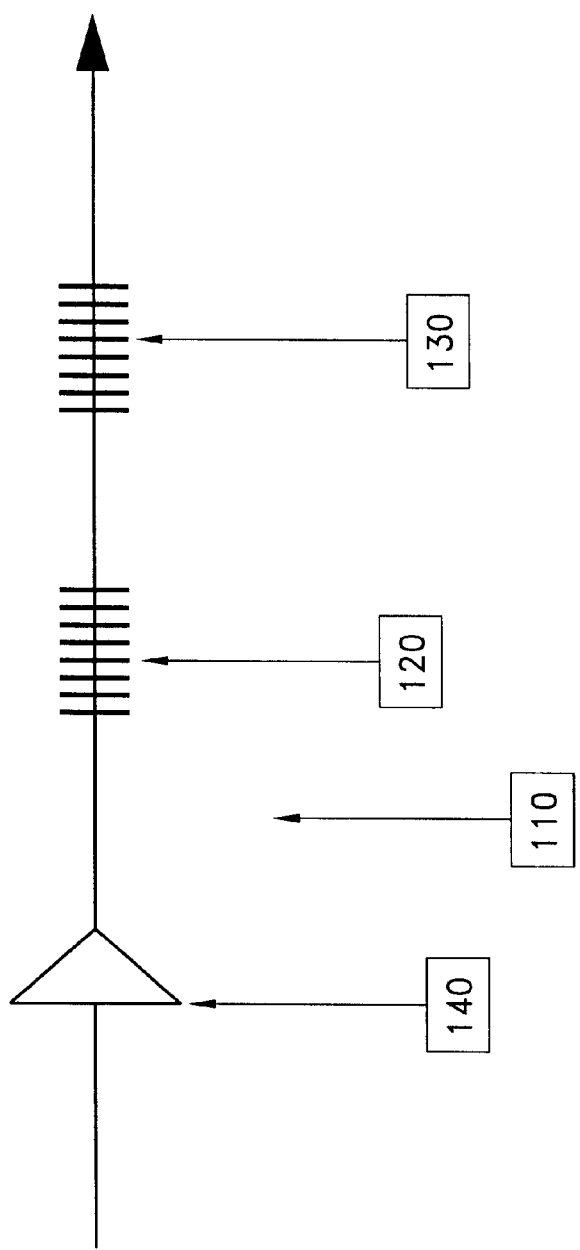
FIG. 11 is a functional diagram of an optical component in accordance with one embodiment of the invention.

As noted above, FIG. 11 is a functional diagram of an optical component in accordance with one embodiment of the invention. As shown in FIG. 11, a waveguide 110 includes a first long period grating 120 formed therein. The waveguide 110 further includes a second long period grating 130 formed therein. In one embodiment, the period of the first long period grating 120 is different from the period of the second long period grating 130. More particularly, the peak wavelength of the first long-period grating 120 may be selected within the range of approximately 1500–1525 nm. The peak wavelength of the second long-period grating 130 may be selected within the range of approximately 1545–1565 nm. The waveguide 110 may receive an optical waveform from an optical amplifier 140, such as an EDFA or Etalon filter used in combination with an EDFA.

Figure 1A:
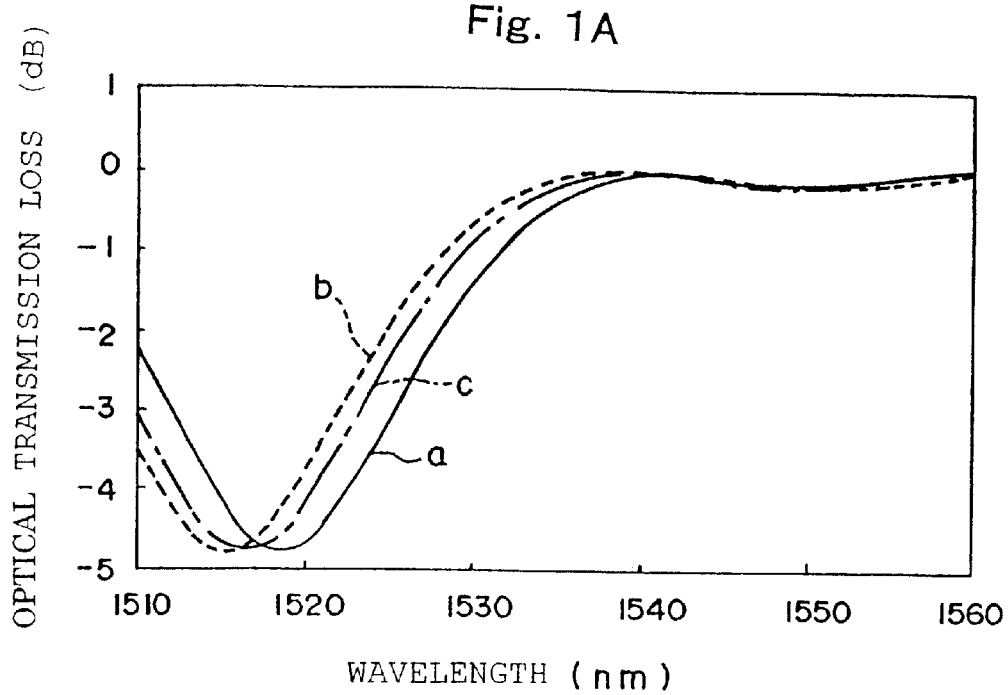
FIG. 1A is a graph of the optical transmission loss characteristics of a first long-period grating, which is one structural element of an optical component according to a preferred embodiment of the present invention, at respectively 0° C., 25° C. and 65° C.

FIG. 1A shows the optical transmission loss characteristic of the first long-period grating with respect to a wavelength from 1510 nm to 1560 nm. The first long-period grating, due to coupling between a propagation mode and a high-order clad mode of the long-period grating, exhibits unique optical transmission loss characteristic in which there are a plurality of optical transmission loss peaks which are apart from each other in terms of wavelengths ranging from a first-order mode to an Nth-order mode (where N is an integer equal to or larger than 2).

With respect to the unique optical transmission loss peaks of the first long-period grating, FIG. 1A shows a optical transmission loss peak wavelength of a preset-order mode (a preset-order mode for the first long-period grating) and a optical transmission loss waveform having this transmission loss peak waveform (an amplitude waveform of a optical transmission loss with respect to a wavelength). In the preferred embodiment, the preset-order mode for the first long-period grating is a fifth-order mode.

Figure 2A:
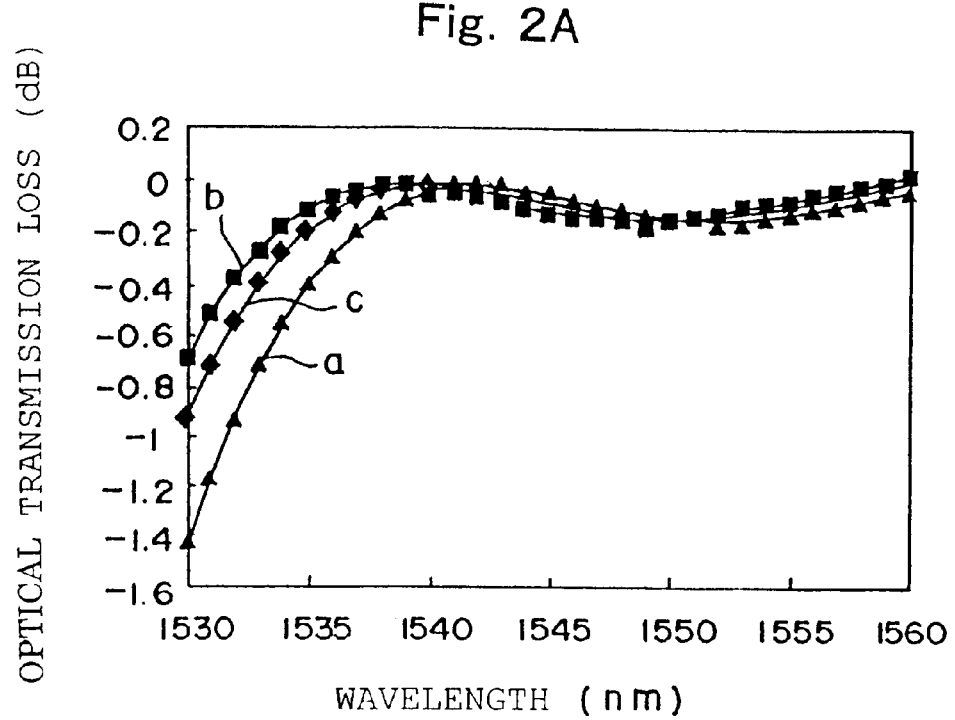
FIG. 2A is a graph of the optical transmission loss characteristics of the first long-period grating at 0° C., 25° C. and 65° C., showing a closeup of the portion corresponding to wavelengths from 1530 nm to 1560 nm.

FIG. 2A shows the optical transmission loss characteristic of the first long-period grating at wavelengths from 1530 nm to 1560 nm, on a larger scale than in FIG. 1A. In FIGS. 1A and 2A, the characteristic curve a represents the optical transmission loss characteristic of the first long-period grating at 65° C., the characteristic curve b represents the optical transmission loss characteristic of the first long-period grating at 0° C., and the characteristic curve c represents the optical transmission loss characteristic of the first long-period grating at 25° C.

As denoted by characteristic curves a through c, with respect to the first long-period grating, the peak wavelength of the optical transmission loss waveform in the preset-order mode for the first long-period grating (fifth-order mode) is positioned at a wavelength that is longer than the wavelengths within the range of the said transmission band (which is from 1525 nm to 1565 nm in this case). Meanwhile, a optical transmission loss peak waveform (not shown) in the next order mode for the first long-period grating (sixth-order mode) is positioned at a wavelength that is longer than the wavelengths within the range of the said transmission band.

Further, within the transmission band, in a longer wavelength side zone (from approximately 1540 nm to approximately 1565 nm) than a zone in which the first long-period grating compensates the temperature dependent gain characteristic of the optical amplifier, a difference between a maximum optical transmission loss and a minimum optical transmission loss within the operating temperature range (0° C. to 65° C. in this case) is 0.1 dB or smaller.

In addition, as clearly denoted by the characteristic curves a through c, the higher the temperature becomes, the more the peak wavelength in the preset-order mode for the first long-period grating and the optical transmission loss peak waveform having this peak wavelength shift toward the longer wavelength side. Hence, in the case of the optical component according to the embodiment comprising the first long-period grating, a optical transmission loss value on the shorter wavelength side than the transmission band increases as the temperature becomes higher. The peak wavelength in the preset-order mode for the first long-period grating (fifth-order mode) shifts by the amount of 0.055 nm/° C.

Figure 2B:
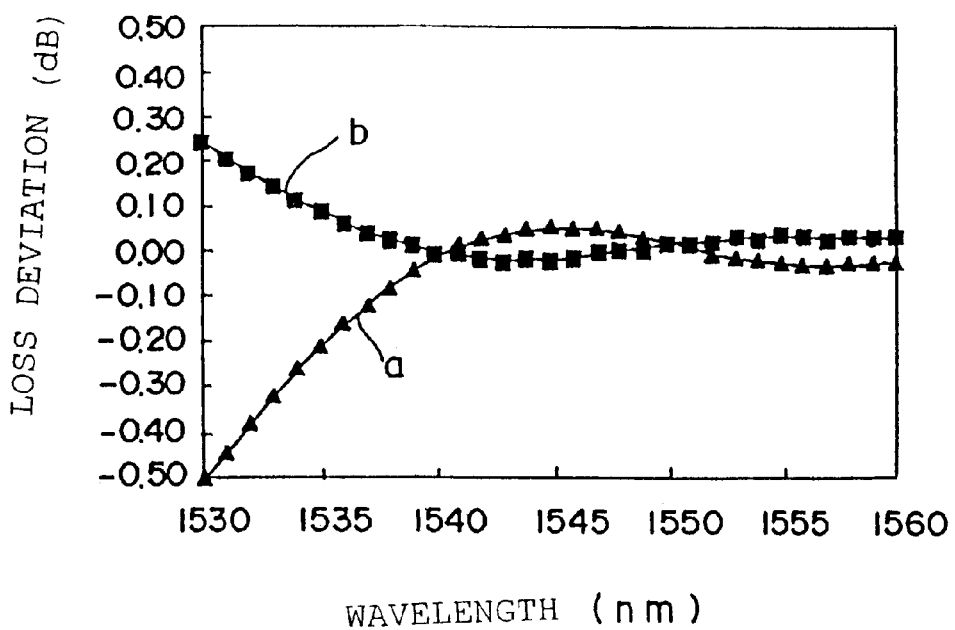
FIG. 2B is a graph of loss deviations of the first long-period grating at 0° C. and 65° C. relative to 25° C. which is used as a reference.

As shown in FIG. 2A, a optical transmission loss value of the first long-period grating at 1530 nm is approximately −0.65 dB at 0° C. and approximately −1.4 dB at 65° C. As shown in FIG. 2B, the first long-period grating has a loss deviation from 25° C. to 65° C. denoted at the characteristic curve a of approximately −0.5 dB at 1530 nm and a loss deviation from 25° C. to 0° C. denoted at the characteristic curve b of approximately +02.5 dB at 1530 nm. This loss deviation characteristic has the opposite directivity to the gain deviation characteristic of an EDFA and the loss deviation characteristic of an etalon filter.

Figure 5:
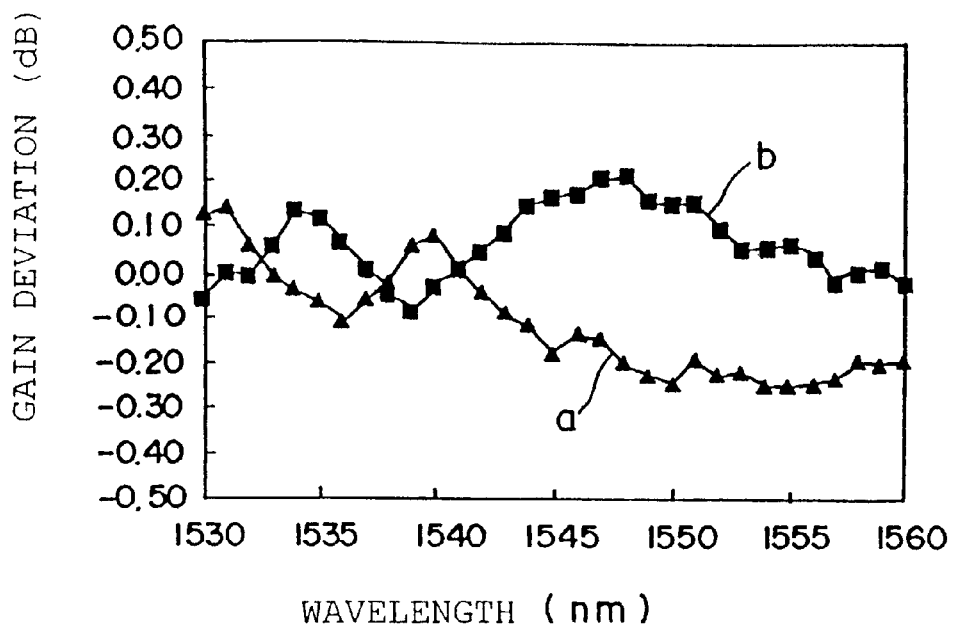
FIG. 5 is a graph of gain deviations at 0° C. and 65° C. relative to 25° C. which is used as a reference, where the first long-period grating is combined with an EDFA device (a device in which an EDFA and an etalon filter are combined to each other)

Accordingly, when the first long-period grating described above is combined with an EDFA device (device in which an EDFA and an etalon filter are combined with each other), FIG. 5 is obtained. Thus, it is possible to compensate a temperature dependent gain characteristic of the EDFA device to ±0.2 dB or smaller in a compensation zone up to 1540 nm within the transmission band. The characteristic curve a in FIG. 5 represents the gain deviation characteristic between 65° C. and 25° C. of the combination of the EDFA device described above and the first long-period grating described above, while the characteristic curve b in FIG. 5 represents the gain deviation characteristic between 25° C. and 0° C. of the combination.

Figure 1B:
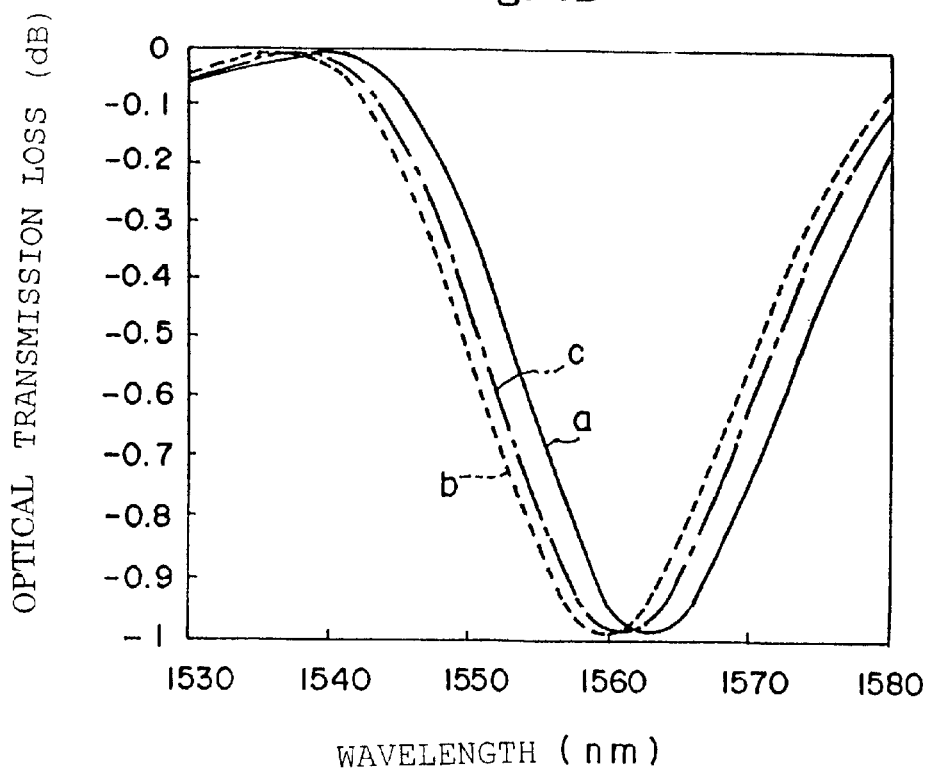
FIG. 1B is a graph of a optical transmission loss characteristic of a second long-period grating, which is one structural element of an optical component according to the preferred embodiment of the present invention, at respectively 0° C., 25° C. and 65° C.

On the other hand, FIG. 1B shows the optical transmission loss characteristic of the second long-period grating described above with respect to a wavelength from 1530 nm to 1580 n mm. The second long-period grating as well has a unique optical transmission loss characteristic, owing to the coupling of a propagation mode and a high-order clad mode of the long-period grating, that there are a plurality of optical transmission loss peaks which are apart from each other in terms of wavelength ranging from a first-order mode to an Nth-order mode (where N is an integer equal to or larger than 2).

As is clearly visible by comparing FIG. 1A with FIG. 1B, the optical transmission loss characteristic of the first long-period grating and the optical transmission loss characteristic of the second long-period grating are different from each other.

With respect to the unique optical transmission loss peaks of the second long-period grating, FIG. 1B shows a optical transmission loss peak wavelength in a preset-order mode (a preset-order mode for the second long-period grating) and a optical transmission loss waveform having this transmission loss peak waveform (an amplitude waveform representing optical transmission losses with respect to a wavelength). In the preferred embodiment, the preset-order mode for the second long-period grating is a fourth-order mode.

Figure 3A:
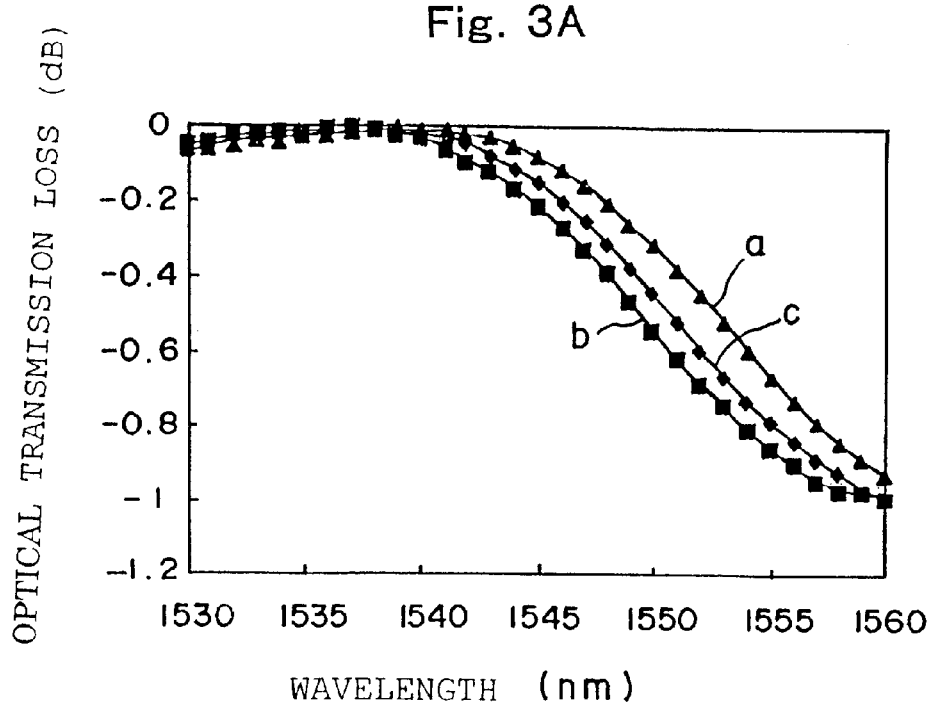
FIG. 3A is a graph of the optical transmission loss characteristic of the second long-period grating at 0° C., 25° C. and 65° C., showing a closeup of the portion corresponding to wavelengths from 1530 nm to 1560 nm.

FIG. 3A shows the optical transmission loss characteristic of the second long-period grating at a wavelength from 1530 nm to 1560 nm, on a larger scale than in FIG. 1B. In FIGS. 1B and 3A, the characteristic curve a represents the optical transmission loss characteristic of the second long-period grating at 65° C., the characteristic curve b represents the optical transmission loss characteristic of the second long-period grating at 0° C., and the characteristic curve c represents the optical transmission loss characteristic of the second long-period grating at 25° C.

Figure 3B:
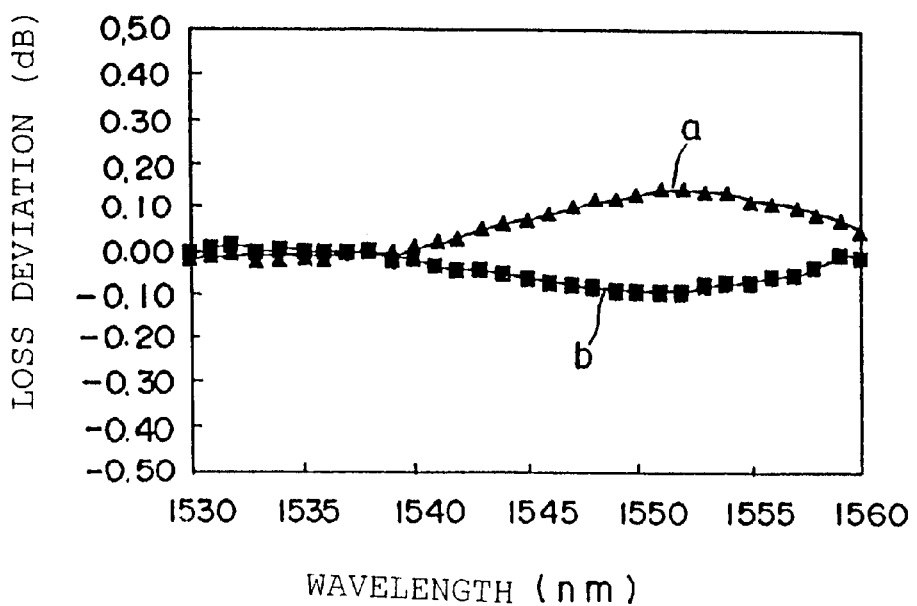
FIG. 3B is a graph of loss deviations of the second long-period grating at 0° C. and 65° C. relative to 25° C. which is used as a reference.

As shown in these drawings, an absolute value of the optical transmission loss at the peak wavelength in the preset-order mode for the second long-period grating is as small as approximately 1 dB. In the meantime, FIG. 3B shows a loss deviation from 25° C. to 65° C. of the second long-period grating (the characteristic curve a) and a loss deviation from 25° C. to 0° C. of the second long-period grating (the characteristic curve b). As shown in FIG. 3B, the loss deviation from 25° C. to 65° C. of the second long-period grating in the band from 1550 nm to 1555 nm is approximately 0.1 to 0.15 dB, whereas the loss deviation from 25° C. to 0° C. of the second long-period grating in the same frequency band is approximately −0.1 dB.

As shown in FIG. 5, while a combination of the first long-period grating described above and the EDFA device described above can compensate for the temperature dependent gain characteristic of an EDFA device in a compensation zone (1530 nm to 1540 nm) of the first long-period grating within the transmission band, a gain deviation which can not be compensated by the first long-period grating is approximately 0.15 dB at maximum within the transmission band. In order to compensate the residual gain deviation of approximately 0.15 dB by the second long-period grating, the second long-period grating is set so as to exhibit a gain deviation such as that shown in FIG. 3B.

Further, in this preferred embodiment, the second long-period grating is set such that a difference between the maximum optical transmission loss and the minimum optical transmission loss within the operating temperature range is 0.1 dB or smaller in a shorter wavelength side zone (from approximately 1525 nm to approximately 1540 nm) than a zone in which the second long-period grating compensates the temperature dependent gain characteristic of the optical amplifier within the transmission band. In this preferred embodiment, since the optical transmission loss at the peak wavelength in the preset-order mode for the second long-period grating is as small as 1 dB or smaller as described above, it is easy to ensure that the difference between the maximum optical transmission loss and the minimum optical transmission loss within the operating temperature range is 0.1 dB or smaller in the wavelength range from approximately 1525 nm to approximately 1540 nm.

Both the peak wavelength in the preset-order mode for the second long-period grating and a optical transmission loss waveform having this transmission loss peak waveform shift toward the longer wavelength side, as the temperature becomes higher. The peak wavelength in the preset-order mode for the second long-period grating (fifth-order mode) shifts by the amount of 0.045 nm/° C.

As is clearly visible by comparing FIG. 3B with FIG. 5, the loss deviation characteristic of the second long-period grating has the opposite directivity to the gain deviation characteristic of the combination of the EDFA, the etalon filter and the first long-period grating described above.

Hence, in an optical component comprising the first long-period grating described earlier and the second long-period grating which has such characteristic as above, as shown in FIG. 5, the loss deviation characteristic of the second long-period grating compensates a gain deviation characteristic which remains uncompensated by the first long-period grating in a wavelength range from 1540 nm to 1560 nm. As a result, it is possible to suppress the gain deviation from 25° C. to 65° C. and the gain deviation from 25° C. to 0° C. to ±0.15 dB or smaller in the entire wavelength range from 1530 nm to 1560 nm, as shown in FIG. 6.

Figure 6:
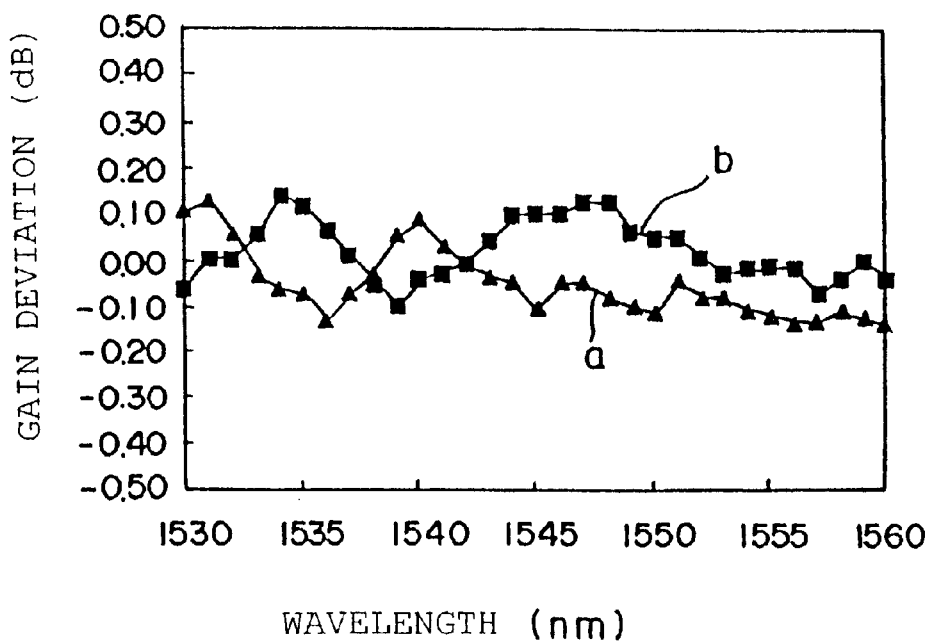
FIG. 6 is a graph of gain deviations at 0° C. and 65° C. relative to 25° C. which is used as a reference, where the optical component according to the preferred embodiment is combined with an EDFA device (a device in which an EDFA and an etalon filter are combined to each other)

Although FIG. 6 does not show the gain deviation characteristic in the wavelength ranges from 1525 nm to 1530 nm and from 1560 nm to 1565 nm, in this preferred embodiment, the gain deviation from 25° C. to 65° C. and the gain deviation from 25° C. to 0° C. are suppressed to ±0.15 dB or smaller also in these wavelength ranges. Hence, with the EDFA, the etalon filter, the first long-period grating and the second long-period grating combined with each other, it is possible to suppress both the gain deviation from 25° C. to 65° C. and the gain deviation from 25° C. to 0° C. to ±0.15 dB or smaller in the entire transmission band of 1525 nm to 1565 nm.

By the way, in order to equip the first long-period grating and the second long-period grating described above with the characteristics described above, the inventor of the present invention has determined the structures of the first long-period grating and the second long-period grating through considerations described below.

In general, an optical fiber, even an optical fiber called a single-mode optical fiber, does not have a single mode in a strict sense since the thickness of a clad has a finite value. Rather, an optical fiber has a number of high-order modes ($HE_{12}$, $HE_{13}$, . . . , $HE_{im}$, etc.) in which confinement is weak and attenuation soon occurs, in addition to a mode which allows propagation in a core ($HE_{11}$). The high-order modes are called clad modes.

Forming a long-period grating in an optical fiber ensures optical transmission loss characteristics, owing to the coupling of a propagation mode and the high-order clad modes of the long-period grating, that there are a plurality of optical transmission loss peaks which are apart from each other in terms of wavelength ranging from the first-order mode to an Nth-order mode (where N is an integer equal to or larger than 2).

With a grating period (periodical change) set to approximately 100 μm through a few hundred μm, it is possible to couple power in the waveguide mode of the optical fiber to the clad modes, and therefore, the power coupled to the clad modes becomes almost entirely a loss. Due to this, an optical fiber in which a long-period grating is formed has a optical transmission loss peak wavelength as described above, and the long-period grating, unlike a short-period grating, functions as a filter element which does not cause reflection. Thus, a long-period grating also has a function of suppressing ASE (Amplified Spontaneous Emission) light from an EDFA.

Where the period of the grating is Λ, an effective refractive index of the core in the propagation mode is $n_{c0}$ and an effective refractive index in an nth-order (where n is an integer equal to or larger than 1) cladmode is $n_{c1}^{(n)}$, a plurality of optical transmission loss peak wavelengths (central wavelengths) μm ranging from the first-order mode to the Nth-order mode described above are expressed by the formula (2) below:

$$\lambda c = \Lambda(n_{co} - n_{c1}^{(n)}) \qquad (2)$$

In the formula (2) above, n in $n_{c1}^{(n)}$ is 1 for calculation of a optical transmission loss peak wavelength in the first-order mode, while n in $n_{c1}^{(n)}$ is n=N for calculation of a optical transmission loss peak wavelength in the Nth-order mode.

Since the effective refractive index in the propagation mode in the core and the effective refractive index in the clad mode are determined by compositions and the like of the core and the clad, with at least one of the compositions of the optical fiber and the grating period set with a wide range of variety, it is possible to determine the plurality of optical transmission loss peak wavelengths ranging from the first-order mode to the Nth-order mode.

The first-order mode is a coupling wavelength which couples a basic mode (propagation mode) $HE_{11}$ to a high-order mode $HE_{12}$. A second-order mode is a coupling wavelength which couples the basic mode $HE_{11}$ to a high-order mode $HE_{13}$, and a third-order mode is a coupling wavelength which couples the basic mode $HE_{11}$ to a high-order mode $HE_{14}$, and the nth-order mode is a coupling wavelength which couples the basic mode $HE_{11}$ to a high-order mode $HE_{1m}$ (m=n+1 in this case).

Figure 4:
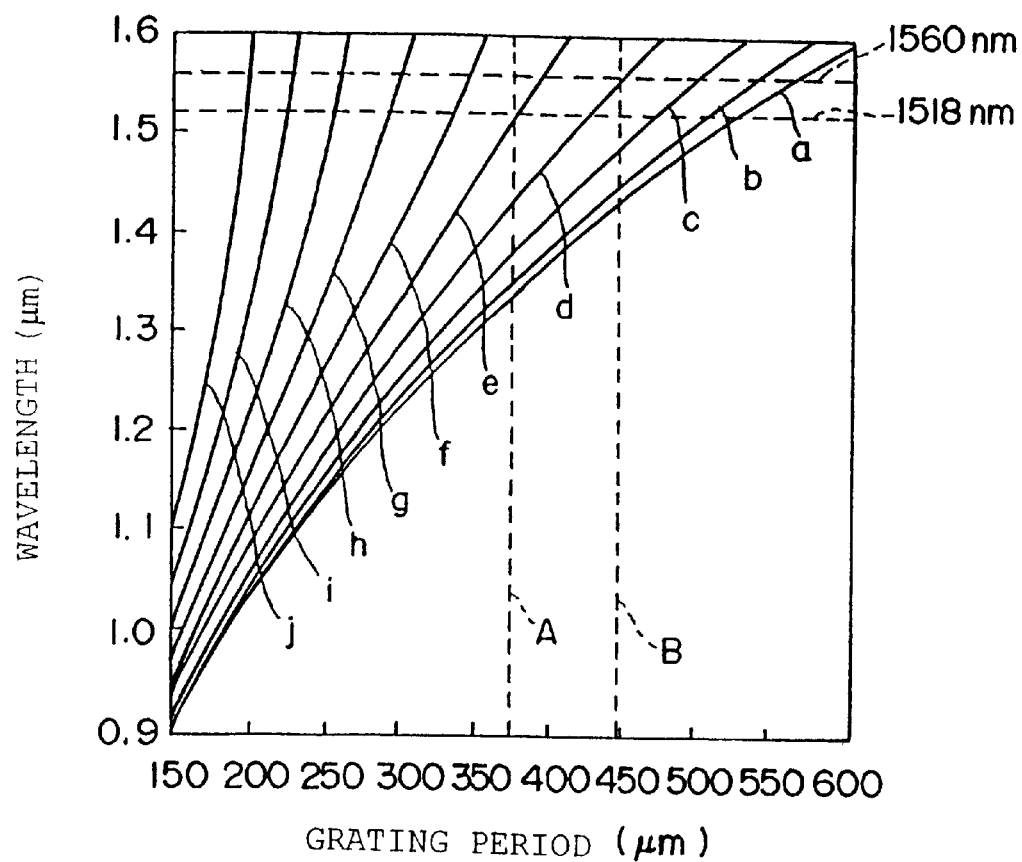
FIG. 4 is a graph schematically showing the relationships between a grating period created in an optical fiber and a coupling wavelength of the optical fiber in a condition where the optical fiber has a constant composition.

FIG. 4 schematically shows the relationships between a grating period created in an optical fiber and a coupling wavelength of the optical fiber in a condition where the optical fiber has a constant composition. The coupling wavelengths denoted by the characteristic curves a through j in FIG. 4 are wavelengths which lead to an extreme (peak) optical transmission loss value, and therefore, as herein described, the coupling wavelengths above will be referred to as optical transmission loss peak wavelengths ranging from the first-order mode to the Nth-order mode (N=10 in FIG. 4). In FIG. 4, the characteristic curve a represents the first-order mode, the characteristic curve b represents the second-order mode, the characteristic curve c represents the third-order mode, and the characteristic curve d represents the fourth-order mode, denoting optical transmission loss peaks at the first-order, the second-order, the third-order, . . . the tenth-order modes in this order from the right-hand side in FIG. 4. The values shown in FIG. 4 are values at 25° C.

As shown in FIG. 4, scince the grating period (fiber grating period) created in the optical fiber is set to 150 μm through approximately 580 μm, for instance, it is possible to generate optical transmission loss peak wavelengths in modes of a plurality of orders within a wavelength range from 0.9 μm (900 nm) to 1.6 μm (1600 nm). In addition, by changing the grating period, it is possible to determine freely peak wavelengths in the respective modes at 25° C.

Against this background, first, the inventor of the present invention has studied a grating period to be created in a single-mode optical fiber and a corresponding presetorder mode such that the first long-period grating described above has such a characteristic as is described below.

That is, the inventor discovered that of the plurality of optical transmission loss peaks described above which are generated due to the first long-period grating, the optical transmission loss peak wavelength in the preset-order mode for the first long-period grating which is set in advance would be on the shorter wavelength side than the transmission band, the optical transmission loss peak wavelength in a mode next to the preset-order mode would be on the longer wavelength side than the transmission band, and that in a zone (from approximately 1540 nm to approximately 1565 nm) within the transmission band on the longer wavelength side than a zone in which the first long-period grating compensates the temperature dependent gain characteristic of the EDFA, the difference between the maximum optical transmission loss and the minimum optical transmission loss within the operating temperature range described earlier would be 0.1 dB or smaller.

In consequence, it was found that when the grating period was approximately 375 μm, at the intersections between the dotted line A and the characteristic curves a through d in FIG. 4, a optical transmission loss peak wavelength in the fifth-order mode (i.e., a wavelength at the intersection between the dotted line A and the characteristic curve e) was generated with a distance from a optical transmission loss peak wavelength in the first-order mode (i.e., a wavelength at the intersection between the dotted line A and the characteristic curve a), and when the preset-order mode for the first long-period grating was the fifth-order mode, the optical transmission loss peak wavelength in the fifth-order mode was approximately 1518 nm.

Further, a optical transmission loss peak wavelength in a second-order mode, which is the mode next to the preset-order mode for the first long-period grating, is on the longer wavelength side than 1600 nm, and of the transmission band above, on the longer wavelength side than the zone in which the first long-period grating compensates the temperature dependent gain characteristic of the EDFA, a difference between a maximum value and a minimum value of the optical transmission loss characteristic stays approximately flat at 0.1 dB or smaller.

When a optical transmission loss peak wavelength is to be generated in the vicinity of the wavelength of 1518 nm which is on the shorter wavelength side than the transmission band, any one of the characteristic curves a through j shown in FIG. 4 intersects with the wavelength of 1.518 μm (1518 nm). Hence, determining a preset-order mode in correspondence with the value of a period of a grating, even if the value of the grating period is different from approximately 375 μm, a long-period grating creating a optical transmission loss peak wavelength in the vicinity of 1518 nm is obtained.

However, when, for instance, the period of the grating has a value which is at the intersection between the wavelength of 1518 nm and the characteristic curve j (the characteristic curve corresponding to a tenth-order mode), since the characteristic curve j has a steep gradient, the value of a optical transmission loss peak wavelength could deviated greatly due to an error in generating the period of the grating, and therefore, it would be difficult to improve the production yield of the first long-period grating.

Further, it is necessary to ensure that a peak wavelength representing a optical transmission loss of the first long-period grating does not exist in the transmission band. Considering this and considering the ease of manufacturing long-period gratings, in the embodiment of the present invention, as described above, the grating period of the first long-period grating is approximately 375 μm and the preset-order mode for the first long-period grating is the fifth-order mode.

Still further, when calculating a grating period in a similar manner to calculation for the first long-period grating, such that of the plurality of optical transmission loss peaks described above which are generated due to the second long-period grating, the optical transmission loss peak wavelength of the preset-order mode for the second long-period grating which is set in advance would be on the longer wavelength side than the transmission band and the optical transmission loss peak wavelength in a mode immediately precedent to the preset-order mode would be on the shorter wavelength side than the transmission band, it was found that setting the grating period to approximately 445 μm was appropriate.

With the grating period of the second long-period grating determined in this manner, a optical transmission loss peak wavelength in the fourth-order mode (i.e., a wavelength at the intersection between the dotted line B and the characteristic curve d) is generated from a optical transmission loss peak wavelength in the first-order mode (i.e., a wavelength at the intersection between the dotted line B and the characteristic curve a) at the intersections between the dotted line B and the characteristic curves a through d in FIG. 4. When the preset-order mode for the second long-period grating is set as the fourth-order mode, the optical transmission loss peak wavelength of the fourth-order mode is approximately 1560 nm.

Further, it was found that a optical transmission loss peak wavelength of the third-order mode, which is the mode immediately precedent to the preset-order mode for the second long-period grating, was on the shorter wavelength side than 1500 nm, and a difference between a maximum value and a minimum value of the optical transmission loss characteristic stayed approximately flat at 0.1 dB or smaller in a wavelength range from 1530 nm to 1540 nm.

In addition, since it is possible to enlarge an amplitude waveform representing optical transmission losses with respect to a wavelength when ultraviolet light is irradiated upon a long-period grating for a long period of time, an irradiation time for irradiating ultraviolet light to form the first long-period grating was set to be long while an irradiation time for irradiating ultraviolet light to form the second long-period grating was set to be short, and the optical transmission loss characteristics as those shown in FIGS. 1A and 1B were obtained.

Next, temperature dependent shift characteristics of the optical transmission loss peak wavelengths of the first and the second long-period gratings were discussed. Temperature dependent shift characteristic of a optical transmission loss characteristic of an optical component in which a long-period grating is formed can be identified by differentiating the formula (2) described earlier by a temperature T, and is expressed by a formula (3) below:

$$d\lambda c/dT = \{(n_{co} - n_{c1}^{(n)})d\Lambda/dT\} + \Lambda\{(n_{co}/dT) - (n_{c1}^{(n)}/dT)\} \quad (3)$$

Since $d\Lambda/dT \approx 0$, the formula (3) approximates to the formula (4) below:

$$d\lambda c/dT = \Lambda\{(n_{co}/dT) - (n_{c1}^{(n)}/dT)\} \quad (4)$$

This therefore shows that a temperature dependent shift characteristic of an Nth-order optical transmission loss peak wavelength is generated dependent on the difference between the effective refractive index of a propagation mode and the effective refractive index in an nth-order clad mode (where n=N) in a core. Meanwhile, a temperature dependent shift characteristic of the first-order optical transmission loss peak wavelength is generated which is dependent on the difference in the effective refractive index between the propagation mode and a first-order clad mode in a core. The temperature dependent shift characteristic of the Nth-order optical transmission loss peak wavelength changes in accordance with the order of clad modes.

In addition, where an optical fiber forming an optical component is a single-mode optical fiber which has a relative refractive index difference $\Delta$ calculated by the formula (1) above as in this embodiment, since $(n_{co}/dt) > (n_{c1}^{(n)}/dT)$, the first-order to the Nth-order optical transmission loss peak wavelengths shift toward the longer wavelength side as the temperature increases.

The temperature dependent shift characteristic of a optical transmission loss peak wavelength of the fifth-order mode (approximately 1518 nm) of the first long-period grating was calculated by the formula (4) above where the grating period was approximately 375 μm and the preset-order mode was the fifth-order mode, and a temperature dependent shift characteristic of the optical transmission loss peak wavelength of the fourth-order mode (approximately 1560 nm) of the second long-period grating was calculated by the formula (4) above where the grating period was approximately 445 μm and the preset-order mode was the fourth-order mode. The calculated values were approximately 0.055 nm/° C. and approximately 0.045 nm/° C., respectively.

As one example, the structures of the first and the second long-period gratings were determined based on the above consideration, and the first long-period grating and the second long-period grating were provided respectively with the characteristics as those shown in FIGS. 1A and 1B. In consequence, as shown in FIG. 6, a gain deviation from 25° C. to 65° C. and a gain deviation from 25° C. to 0° C. were suppressed to ±0.15 dB or smaller in the entire wavelength range from 1530 nm to 1560 nm.

The present invention however is not limited to the preferred embodiment described above but may be applied to various other preferred embodiments. For instance, while the preferred embodiment described above requires that the period of the first long-period grating is approximately 375 μm and the period of the second long-period grating is approximately 445 μm, the periods of the first and the second long-period gratings are not particularly limited, but may rather be set appropriately.

For example, in the case that a transmission band is 1525 nm to 1565 nm, the first long-period grating creates a optical transmission loss peak wavelength in the vicinity of the wavelength of 1518 nm which is on the shorter wavelength side than the transmission band while the second long-period grating creates a optical transmission loss peak wavelength in the vicinity of the wavelength of 1560 nm which is on the longer wavelength side than the transmission band, any one of the characteristic curves in FIG. 4 intersects with the wavelength of 1.518 μm (1518 nm) and the wavelength of 1.56 μm (1560 nm).

Hence, the first and the second long-period gratings are constructed with the preset-order modes determined in accordance with the values of the grating periods of the first and the second long-period gratings.

However, since it is necessary to consider the ease of manufacturing optical components, and the width of the transmission band and the like as described earlier, in order to combine with a device which comprises an EDFA which exhibits the temperature dependent gain characteristic as that shown in FIG. 7 and an etalon filter which exhibits the temperature dependent gain characteristic as that shown in FIG. 8, it is preferable to determine the periods of the first and the second long-period gratings as in the preferred embodiment described above.

Further, while the preferred embodiment requires that the temperature dependent shift characteristic of the peak wavelength of the preset-order mode for the first long-period grating (peak wavelength located on the shorter wavelength side than the transmission band of the amplitude waveform representing optical transmission losses with respect to a wavelength) and the temperature dependent shift characteristic of the peak wavelength of the preset-order mode for the second long-period grating (peak wavelength located on the longer wavelength side within the transmission band of the amplitude waveform representing optical transmission losses with respect to a wavelength) are approximately 0.055 nm/° C. and approximately 0.045 nm/° C., respectively, these temperature dependent shift characteristics are not particularly limited. For example, with these temperature dependent shift characteristics set to approximately 0.02 nm/° C. to approximately 0.07 nm/° C., it is possible to obtain an optical component which can properly compensate the temperature dependent gain characteristic of an EDFA device which is a combination of an EDFA and an etalon filter.

In addition, as indicated by the formulas (2) and (4) above, since the first-order to the Nth-order optical transmission loss peak wavelengths and the associated temperature dependent shift characteristics change depending on an effective refractive index of the propagation mode in a core as well, the effective refractive index of the propagation mode in the core may be changed to thereby control the first-order to the Nth-order optical transmission loss peak wavelengths arising from the optical transmission loss characteristics which are unique to the first and the second long-period gratings and the associated temperature dependent shift characteristics.

In this case, for the purpose of changing the effective refractive index of the propagation mode in the core, the amount of germanium which dopes an optical fiber core, for example, to change the relative refractive index difference $\Delta$ of the core, or the amount of ultraviolet light which is used to form fiber gratings may be changed. In this manner, the refractive index of the core can be changed (increased, for instance).

Moreover, although the embodiment requires that with respect to the first long-period grating, in a zone within the transmission band which is on the longer wavelength side than the zone in which the first long-period grating compensates for the temperature dependent gain characteristic of the optical amplifier, the difference between the maximum optical transmission loss and the minimum optical transmission loss within the operating temperature range is 0.1 dB or smaller, the difference may be somewhat larger than 0.1 dB. However, it is preferable that the difference is small since this allows the first long-period grating to exert only a small influence over the zone in which the first long-period grating makes compensation.

In a similar manner, although the preferred embodiment requires that with respect to the second long-period grating, in a zone within the transmission band which is on the shorter wavelength side than the zone in which the second long-period grating compensates the temperature dependent gain characteristic of the optical amplifier, the difference between the maximum optical transmission loss and the minimum optical transmission loss within the operating temperature range is 0.1 dB or smaller, the difference may be somewhat larger than 0.1 dB. However, it is similarly preferable that the difference is small since this allows the second long-period grating to exert only a small influence over the zone in which the second long-period grating compensates.

Further, although the preset-order mode for the first long-period grating is the fifth-order mode and the preset-order mode for the second long-period grating is the fourth-order mode in the preferred embodiment described above, the respective preset-order modes are not particularly limited. The preset-order modes for the first and the second long-period gratings are set properly in accordance with the designs. For example, where the preset-order modes are set to any among the second-order through a seventh-order modes in accordance with periodical changes of the long-period gratings, it is easy to manufacture an optical component which has approximately the same effect as that according to the preferred embodiment described above.

Further, although the transmission band is from 1525 nm to 1565 nm in the preferred embodiment described above, the transmission band is not particularly limited, but may be appropriately set in accordance with a wavelength range which is used in a wavelength multiplex transmission system, for instance.

Further, although the preferred embodiment requires that the transmission band is from 1525 nm to 1565 nm and the optical transmission loss peak wavelength of the preset-order mode for the first long-period grating is approximately 1518 nm and the optical transmission loss peak wavelength of the preset-order mode for the second long-period grating is approximately 1560 nm, the optical transmission loss peak wavelengths of these preset-order modes are properly set in accordance with a compensation band for the temperature dependent gain characteristic of an EDFA, for instance.

When the transmission band is from 1525 nm to 1565 nm as described above, it is more preferable that a peak wavelength of the first long-period grating located on the shorter wavelength side than the transmission band is a wavelength within a range from approximately 1500 nm to approximately 1525 nm and a peak wavelength of the second long-period grating located within the transmission band is a wavelength within the range from approximately 1545 nm to approximately 1565 nm.

Further, the optical amplifier according to the present invention for compensating a temperature dependency of gain is not necessarily limited to an EDFA, but may be an optical fiber type amplifier other than an EDFA doped with rare earths or may be other optical amplifier other than an optical fiber type amplifier.

Further, although the first and the second long-period gratings are formed in an optical fiber which serves as an optical waveguide in the preferred embodiment described above, in the optical component according to the present invention, at least one of the first and the second long-period gratings may be formed in an optical waveguide which is formed in a optical planar waveguide circuit, for example.

Further, although the operating temperature range is assumed to be from 0° C. to 65° C. in order to set the characteristics of the first and the second long-period gratings in the preferred embodiment described above, the temperature range may be set otherwise. In addition, although the preferred embodiment requires that the loss deviation characteristics between different temperatures are calculated with reference to 25° C., the loss deviation characteristics between different temperatures may be calculated with reference to a temperature other than 25° C. to thereby set the characteristics of the first and the second long-period gratings.

As described above, since an optical component according to one aspect of the present invention has such a structure that the first and the second long-period gratings, which are formed in an optical waveguide and have different periods from each other, present such amplitude waveforms of optical transmission losses with respect to a wavelength which shift depending on the temperature to thereby compensate the temperature dependent gain characteristic of the optical amplifier within the transmission band, it is possible, using the optical component according to the present invention, to compensate the temperature dependent gain characteristic of the optical amplifier within the transmission band.

Hence, it is possible to combine the optical component according to the present invention comprising the first and the second long-period gratings with a device in which an optical amplifier, such as an EDFA, and an etalon filter are combined with each other (EDFA device), for example, and hence, to compensate a temperature characteristic of gain of the optical amplifier within a transmission band. This in turn makes it possible to realize high-quality wide-band wavelength multiplex transmission entirely in an operating temperature range.

Further, using an optical component according to one aspect of the present invention in which the transmission band is from 1525 nm to 1565 nm, a peak wavelength of the first long-period grating located on the shorter wavelength side than the transmission band is a wavelength within the range from approximately 1500 nm to approximately 1525 nm and a peak wavelength of the second long-period grating located within the transmission band is a wavelength within the range from approximately 1545 nm to approximately 1565 nm, an optical amplification band of the EDFA described above is the transmission band, and therefore, it is possible to realize high-quality wavelength multiplex transmission in this band.

Further, using an optical component according to one aspect of the present invention in which the periods of the first and the second long-period gratings are determined such that predetermined relationships hold between the transmission band and the optical transmission loss peak of the preset-order modes for the first and the second long-period gratings, the optical transmission loss peak of the mode next to the preset-order mode for the first long-period grating and the optical transmission loss peak of the mode immediately precedent to the preset-order mode for the second long-period grating, it is possible to compensate the temperature dependent gain characteristic of the optical amplifier within the transmission band by means of the optical transmission loss peak wavelengths of the respective preset-order modes and shift characteristics of amplitude waveforms.

Further, it is possible to avoid an adverse influence over the transmission band exerted by the optical transmission loss peak of the mode next to the preset-order mode for the first long-period grating and the optical transmission loss peak of the mode immediately precedent to the preset-order mode for the second long-period grating.

Further, it is possible to manufacture an optical component which precisely exhibits the effect described above in an easy manner, if the preset-order modes for the first and the second long-period gratings are set to any among the second-order through the seventh-order modes.

Further, using an optical component according to one aspect of the present invention in which a peak wavelength of the first long-period grating located on the shorter wavelength side than the transmission band and a peak wavelength of the second long-period grating located within the transmission band shift in the amount of approximately 0.02 nm/° C. to approximately 0.07 nm/° C., such shift characteristics can compensate, within the transmission band, the temperature dependent gain characteristic of a device in which an optical amplifier, such as an EDFA, and an etalon filter are combined with each other.

Further, using an optical component according to one aspect of the present invention in which the difference between the maximum optical transmission loss and the minimum optical transmission loss of the first long-period grating within an operating temperature range is 0.1 dB or smaller in a zone within the transmission band which is on the longer wavelength side than the zone in which the first long-period grating compensates the temperature dependent gain characteristic of an optical amplifier, and the difference between a maximum optical transmission loss and a minimum optical transmission loss of the second long-period grating within the operating temperature range is 0.1 dB or smaller in a zone within the transmission band which is on the shorter wavelength side than the zone in which the second long-period grating compensates the temperature dependent gain characteristic of the optical amplifier, it is possible to suppress the influence over a gain of the optical amplifier outside the compensation zones in which the first and the second long-period gratings compensate.

Further, as one example, if periodical changes of the first and the second long-period gratings are respectively from approximately 200 μm to approximately 600 μm it is possible to manufacture an optical component which realize the respective effects above in an easy manner.

What is claimed is:

1. An optical component, comprising:
    a first long-period grating which is formed in an optical waveguide; and
    a second long-period grating which is formed in said optical waveguide,
        wherein said first and said second long-period gratings have different periods from each other,
        said first long-period grating has an optical transmission loss peak wavelength at a wavelength shorter than a transmission band, said amplitude waveform including said peak wavelength shifts depending on a temperature,
        said second long-period grating has a optical transmission loss peak wavelength within said transmission band, said amplitude waveform including said peak wavelength shifts depending on the temperature, and
        due to temperature dependent shifts of said amplitude waveforms in said first and said second long-period gratings, a optical transmission loss value increases or decreases depending on the temperature, whereby the temperature dependent gain characteristic of an optical amplifier is compensated in said transmission band.

2. An optical component according to claim 1, wherein said transmission band is from 1525 nm to 1565 nm,
    said peak wavelength of said first long-period grating is within the range from approximately 1500 nm to approximately 1525 nm, and
    said peak wavelength of said second long-period grating is within the range from approximately 1545 nm to approximately 1565 nm.

3. An optical component according to claim 1, wherein the peak wavelength of said first long-period grating is at a wavelength shorter than said transmission band and the peak wavelength of said second long-period grating located within said transmission band shift in the amount of approximately 0.02 nm/.degree. C. to approximately 0.07 nm/.degree. C.

4. An optical component according to claim 3, wherein the difference between a maximum optical transmission loss and a minimum optical transmission loss of said first long-period grating within an operating temperature range is 0.1 dB or smaller in a zone within said transmission band which is longer in wavelength than a zone in which said first long-period grating compensates said temperature dependent gain characteristic of said optical amplifier, and
    the difference between a maximum optical transmission loss and a minimum optical transmission loss of said second long-period grating within said operating temperature range is 0.1 dB or smaller in a zone within said transmission band which is shorter in wavelength than a zone in which said second long-period grating compensates said temperature dependent gain characteristic of said optical amplifier.

5. An optical component according to claim 4, wherein periodical changes of said first and said second long-period gratings are respectively from approximately 200 μm to approximately 600 μm.

6. An optical component according to claim 3, wherein periodical changes of said first and said second long-period gratings are respectively from approximately 200 μm to approximately 600 μm.

7. An optical component according to claim 1, wherein a difference between the maximum optical transmission loss and the minimum optical transmission loss of said first long-period grating within an operating temperature range is 0.1 dB or smaller in a zone within said transmission band which is longer in wavelength than a zone in which said first long-period grating compensates for said temperature dependent gain characteristic of said optical amplifier, and
    a difference between a maximum optical transmission loss and a minimum optical transmission loss of said second long-period grating within said operating temperature range is 0.1 dB or smaller in a zone within said transmission band which is shorter in wavelength than a zone in which said second long-period grating compensates for said temperature dependent gain characteristic of said optical amplifier.

8. An optical component according to claim 7, wherein periodical changes of said first and said second long-period gratings are respectively from approximately 200 μm to approximately 600 μm.

9. An optical component according to claim 1, wherein periodical changes of said first and said second long-period gratings are respectively from approximately 200 μm to approximately 600 μm.

10. An optical component, comprising a first and a second long-period gratings which are formed in an optical waveguide, wherein said first and said second long-period gratings respectively have unique optical transmission loss characteristics that there are a plurality of optical transmission loss peak wavelengths of a first-order mode to an Nth-order mode which are apart from each other in terms of wavelength (where N is an integer equal to or larger than 2), the period of said first long-period grating is determined such that of unique optical transmission loss peak wavelengths, a optical transmission loss peak wavelength of a preset-order mode is at a wavelength shorter than a transmission band and that a optical transmission loss peak wavelength of a mode next to said preset-order mode is at a wavelength longer than said transmission band, the period of said second long-period grating is determined such that of unique optical transmission loss peak wavelengths, a optical transmission loss peak wavelength of a preset-order mode is within said transmission band and that a optical transmission loss peak wavelength of a mode immediately precedent to said preset-order mode is at a wavelength shorter than said transmission band, and amplitude waveforms, together with optical transmission loss peak wavelengths of said preset-order modes of said first and said second long-period gratings, shift to a longer wavelength or a shorter wavelength depending on the temperature, and a optical transmission loss value increases or decreases depending on the temperature, whereby the temperature dependent gain characteristic of an optical amplifier is compensated in said transmission band.

11. An optical component according to claim 10, wherein said preset-order modes of said first and said second long-period gratings are any one among a second-order through a seventh-order modes.

12. An optical component according to claim 10, wherein a peak wavelength of said first long-period grating is at a wavelength shorter than said transmission band and a peak wavelength of said second long-period grating located within said transmission band shift in the amount of approximately 0.02 nm/.degree. C. to approximately 0.07 nm/.degree. C.

13. An optical component according to claim 12, wherein the difference between a maximum optical transmission loss and a minimum optical transmission loss of said first long-period grating within an operating temperature range is 0.1 dB or smaller in a zone within said transmission band which is longer in wavelength than a zone in which said first long-period grating compensates said temperature dependent gain characteristic of said optical amplifier, and the difference between a maximum optical transmission loss and a minimum optical transmission loss of said second long-period grating within said operating temperature range is 0.1 dB or smaller in a zone within said transmission band which is shorter in wavelength than a zone in which said second long-period grating compensates said temperature dependent gain characteristic of said optical amplifier.

14. An optical component according to claim 13, wherein periodical changes of said first and said second long-period gratings are respectively from approximately 200 μm to approximately 600 μm.

15. An optical component according to claim 12, wherein periodical changes of said first and said second long-period gratings are respectively from approximately 200 μm to approximately 600 μm.

16. An optical component according to claim 10, wherein the difference between a maximum optical transmission loss and a minimum optical transmission loss of said first long-period grating within an operating temperature range is 0.1 dB or smaller in a zone within said transmission band which is longer in wavelength than a zone in which said first long-period grating compensates for said temperature dependent gain characteristic of said optical amplifier, and the difference between a maximum optical transmission loss and a minimum optical transmission loss of said second long-period grating within said operating temperature range is 0.1 dB or smaller in a zone within said transmission band which is shorter in wavelength than a zone in which said second long-period grating compensates said temperature dependent gain characteristic of said optical amplifier.

17. An optical component according to claim 16, wherein periodical changes of said first and said second long-period gratings are respectively from approximately 200 μm to approximately 600 μm.

18. An optical component according to claim 10, wherein periodical changes of said first and said second long-period gratings are respectively from approximately 200 μm to approximately 600 μm.

* * * * *